(12) United States Patent
Shigeeda (10) Patent No.: US 9,762,674 B2
(45) Date of Patent: Sep. 12, 2017

(54) TRAIN COMMUNICATION SYSTEM

(75) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 462 days.

(21) Appl. No.: 14/389,544

(22) PCT Filed: Apr. 2, 2012

(86) PCT No.: PCT/JP2012/059009
§ 371 (c)(1),
(2), (4) Date: Sep. 30, 2014

(87) PCT Pub. No.: WO2013/150601
PCT Pub. Date: Oct. 10, 2013

(65) Prior Publication Data
US 2015/0074277 A1    Mar. 12, 2015

(51) Int. Cl.
*G06F 15/173* (2006.01)
*H04L 29/08* (2006.01)
(Continued)

(52) U.S. Cl.
CPC ........ *H04L 67/12* (2013.01); *H04L 12/40006* (2013.01); *H04L 12/40169* (2013.01);
(Continued)

(58) Field of Classification Search
CPC ............... H04L 67/12; H04L 12/40006; H04L 12/40169; H04L 12/42; H04L 12/4625;
(Continued)

(56) References Cited

U.S. PATENT DOCUMENTS 8,743,873 B2    6/2014  Shigeeda et al.
2010/0303070 A1   12/2010  Shigeeda et al.
(Continued)

FOREIGN PATENT DOCUMENTS

CN    101980885 A    2/2011
CN    102307771 A    1/2012
(Continued)

OTHER PUBLICATIONS

Chinese Office Action dated Oct. 10, 2016 issued in corresponding Chinese Patent Appln. No. 201280072049.7, with English translation (24 pages).
(Continued)

*Primary Examiner* — Normin Abedin
(74) *Attorney, Agent, or Firm* — Buchanan Ingersoll & Rooney PC (57) ABSTRACT

Provided is a network that is constituted in a train formation; communication relay devices; terminal devices; and a position-information distribution device. The communication relay devices rewrite position information from the position-information distribution device to vehicle information indicating positions of vehicles that are provided with the communication relay devices and transfer rewritten information. The terminal devices include an IP-address correspondence table in which IP addresses that are set so as not to overlap with each other for respective types of the terminal devices and are to be used while corresponding to the vehicle information and connection destination information of the terminal devices correspond to each other. IP addresses to be allocated to the terminal devices are decided on the basis of the correspondence table and the vehicle information from the communication relay devices.

6 Claims, 9 Drawing Sheets

(51) Int. Cl.
  *H04L 12/40* (2006.01)
  *H04L 12/46* (2006.01)
  *H04L 12/911* (2013.01)
  *H04L 12/42* (2006.01)
  *H04L 29/12* (2006.01)

(52) U.S. Cl.
  CPC .......... *H04L 12/4625* (2013.01); *H04L 47/70* (2013.01); *H04L 12/42* (2013.01); *H04L 61/2038* (2013.01); *H04L 2012/40293* (2013.01)

(58) Field of Classification Search
  CPC ........... H04L 2012/40293; H04L 47/70; H04L 61/2038
  See application file for complete search history.

(56) References Cited

U.S. PATENT DOCUMENTS

| | | |
|---|---|---|
| 2011/0286464 A1 | 11/2011 | Shigeeda et al. |
| 2012/0263179 A1 | 10/2012 | Shigeeda et al. |
| 2014/0032734 A1 | 1/2014 | Shigeeda et al. |

FOREIGN PATENT DOCUMENTS

| | | |
|---|---|---|
| JP | 4896278 B1 | 1/2012 |
| JP | 2012-50030 A | 3/2012 |
| WO | WO 2010/087258 A1 | 8/2010 |
| WO | WO 2011/074123 A1 | 6/2011 |

OTHER PUBLICATIONS

The extended European Search Report dated Dec. 21, 2015, by the European Patent Office in corresponding European Patent Application No. 12873721.0-1862. (9 pages).
International Search Report (PCT/ISA/210) dated Apr. 24, 2012, by the Japanese Patent Office as the International Searching Authority for International Application No. PCT/JP2012/059009.
Written Opinion (PCT/ISA/237) dated Apr. 24, 2012, by the Japanese Patent Office as the International Searching Authority for International Application No. PCT/JP2012/059009.
Comer, "Internetworking with TCP/IP", vol. 1, $5^{th}$ Edition, Aug. 2008, Kyoritsu Shuppan, pp. 57-68. (corresponds to the $4^{th}$ edition).
Notice of Reason for Rejection, dated Oct. 22, 2014, with English Translation, 5 pages.

(AFTER RECEIVING POSITION INFORMATION PACKET)

| POSITION INFORMATION | PHYSICAL PORT | IP ADDRESS |
| --- | --- | --- |
| 1 | P1 | 192.168.1.1 |
| 1 | P2 | 192.168.1.2 |
| 2 | P2 | 192.168.2.2 |
| 2 | P3 | 192.168.2.3 |
| 3 | P2 | 192.168.3.2 |
| 3 | P3 | 192.168.3.3 |

| POSITION INFORMATION | PHYSICAL PORT | IP ADDRESS |
|---|---|---|
| 1 | P1 | 192.168.1.1 |
| 2 | P2 | 192.168.2.2 |
| 2 | P3 | 192.168.2.3 |
| 3 | P2 | 192.168.3.2 |
| 3 | P3 | 192.168.3.3 |

| POSITION INFORMATION | PHYSICAL PORT | IP ADDRESS |
|---|---|---|
| - | P1 | 192.168.0.1 |
| - | P2 | 192.168.0.2 |
| - | P3 | 192.168.0.3 |

FIG.13

TRAIN COMMUNICATION SYSTEM

FIELD

The present invention relates to a train communication system in a train formation made up of one or more vehicles.

BACKGROUND

Transmission Control Protocol/Internet Protocol (TCP/IP) is a well-known device communication protocol. With TCP/IP, when communication between devices is performed, IP addresses are used as information for identifying the devices. When TCP/IP is used, a predetermined unique IP address needs to be allocated to each of the devices on the network.

There is a method of deciding the IP address of each of the devices on a network. In this method, an IP address is allocated to each device such that addresses do not overlap, the IP addresses are recorded in internal recording devices, and each device uses its recorded IP address when it starts operating.

Furthermore, there is another method of deciding the IP addresses of each device in a network called Reverse Address Resolution Protocol (RARP) (Non Patent Literature 1). With RARP, when a device starts operating, it broadcasts an RARP message onto the network, and an RARP server provided on the network responds to the RARP message and sends an IP address to the transmission source device via the network.

Further, there are alternative IP address distribution methods to the RARP, such as BOOTstrap Protocol (BOOTP) and Dynamic Host Configuration Protocol (DHCP). In any of these methods, an IP address is decided as it is sent to the corresponding device.

CITATION LIST

Patent Literature

Non Patent Literature 1: Internetworking with TCP/IP, Vol. 1, 4th edition, by Douglas E. Comer, August 2008, Kyoritsu Shuppan

SUMMARY

Technical Problem

A case will be considered here in which TCP/IP, as an example, is used as the communication protocol between devices that are provided in train formations. Because trains are operated in units of train formations, each value of the IP address of the devices provided in the same train formation needs to be set differently from each other. Particularly, when taking into account the fact that trains are managed and maintained in units of train formations, it seems to be preferable that, with respect to the same type of devices, different IP addresses thereof are allocated to each vehicle in the same train formation; and among different train formations, when the devices are arranged in the same position in the different train formations, the same IP address thereof is allocated to these devices. Such allocation of IP addresses, if done manually for all the devices by operators each time a train formation is made up, requires a great amount of expense and labor; however, with the conventional techniques, it is difficult to address the need to reduce such problems and the like.

The present invention has been achieved in view of the above problems, and an object of the present invention is to provide a train communication system in which, with respect to the same type of devices, it is possible to reduce the effort employed allocating different IP addresses to the devices in vehicles in the same formation and of allocating the same IP addresses to devices that are located in the same positions in different formations.

Solution to Problem

The present invention is made to solve the problem and to achieve the object mentioned above. Provided is a train communication system that includes: a network that is constituted in a train formation including one or more vehicles; a communication relay device that is provided in each of the vehicles and is connected to the network; one or more terminal devices that are provided in the vehicles and are connected to the communication relay device in a same vehicle and to the network; and a position-information distribution device that is connected to the communication relay device and distributes position information indicating positions of the vehicles in the train formation. The communication relay device rewrites the position information from the position-information distribution device to vehicle information indicating position of a vehicle provided with the communication relay device in the train formation, and transfers vehicle information, and the terminal devices include a correspondence table in which IP addresses that are set so as not to overlap with each other for respective types of the terminal devices and are set to correspond to the vehicle information, connection destination information of the terminal devices, and the position information correspond to each other, and decide IP addresses to be allocated to the terminal devices on the basis of the vehicle information from the communication relay devices and the correspondence table.

Advantageous Effects of Invention

According to the present invention, because IP addresses are decided on the basis of position information that has been converted by a communication relay device, it is possible to reduce the effort employed allocating different IP addresses to the same types of devices in different cars in the same train formation and the effort employed allocating the same IP addresses to the same types of devices positioned in the same location in different train formations.

DESCRIPTION OF EMBODIMENTS

Exemplary embodiments of a train communication system according to the present invention will be explained below in detail with reference to the accompanying drawings. The present invention is not limited to the embodiments.

First Embodiment

Figure 1:
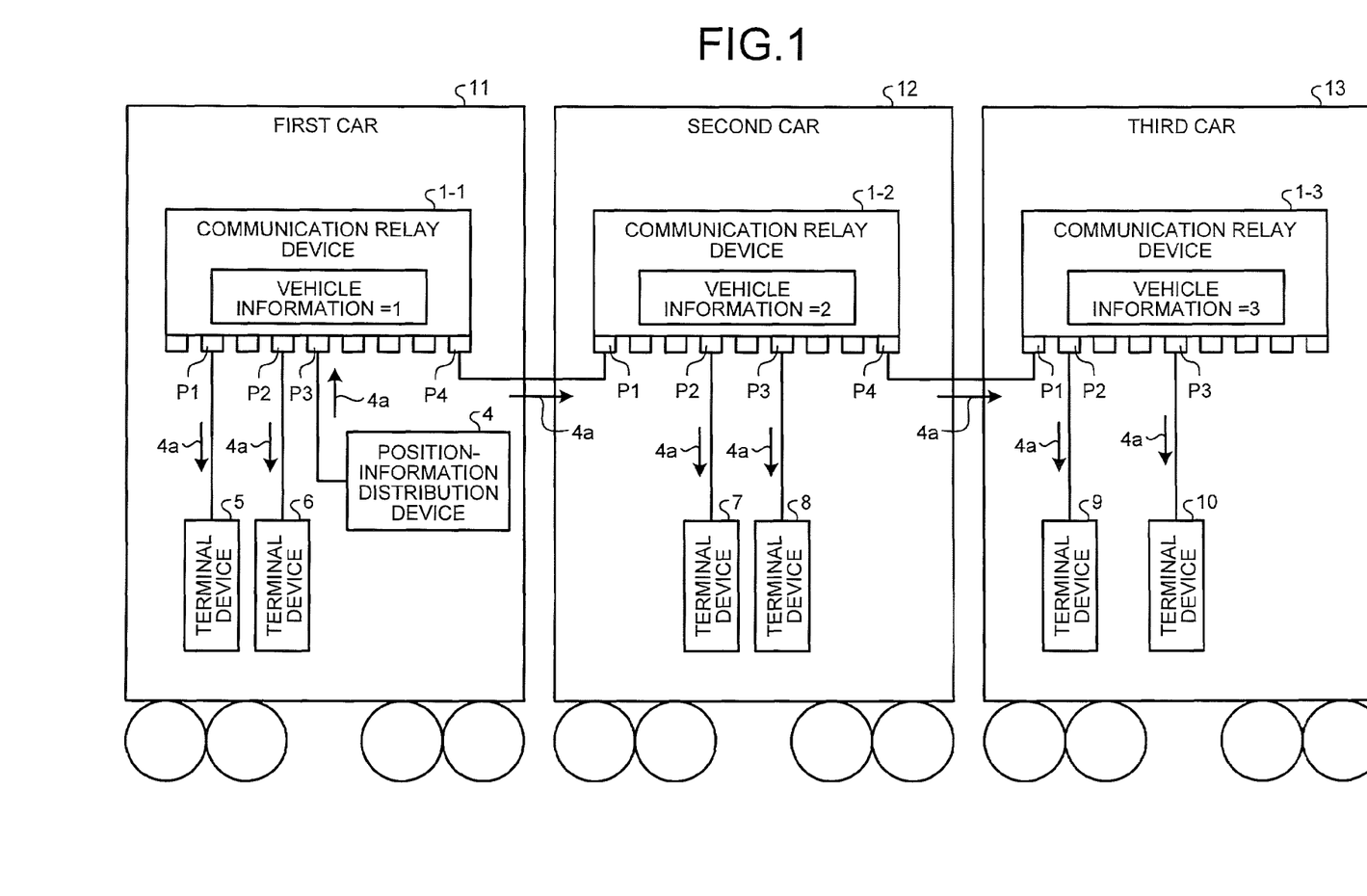
FIG. 1 is a configuration diagram of a train communication system according to a first embodiment of the present invention.
Figure 2:
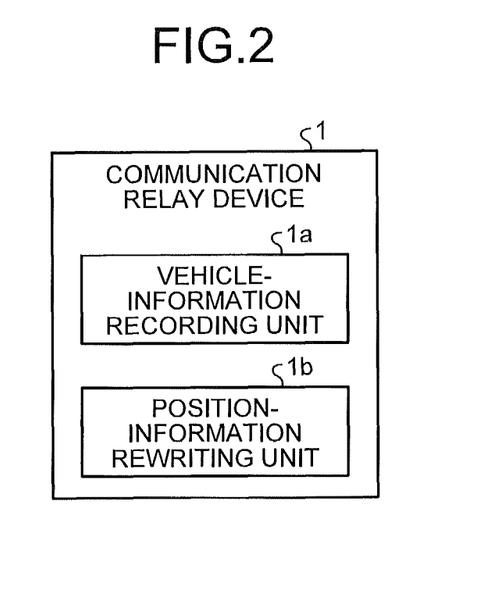
FIG. 2 is a block diagram showing an internal configuration of a communication relay device.
Figure 3:
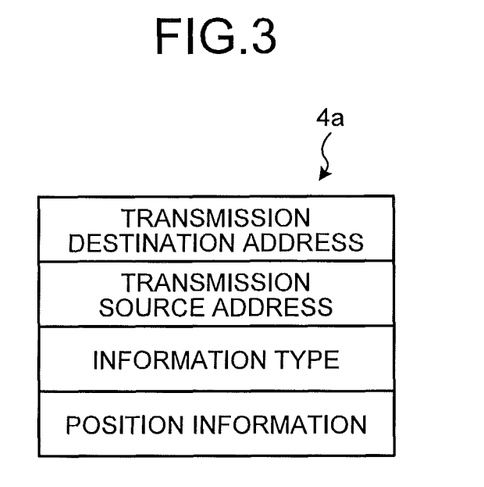
FIG. 3 is a configuration diagram of a position information packet output from a position-information distribution device.
Figure 4:
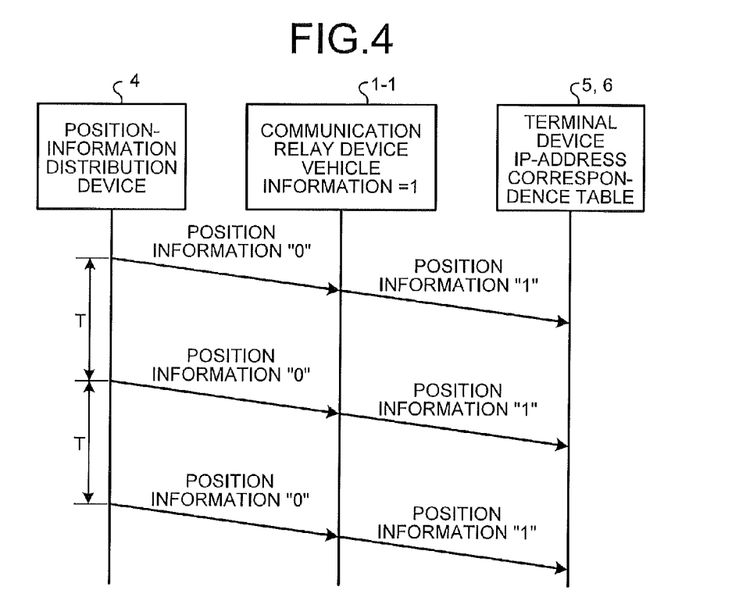
FIG. 4 is a sequence diagram when terminal devices receive a position information packet.
Figure 5:
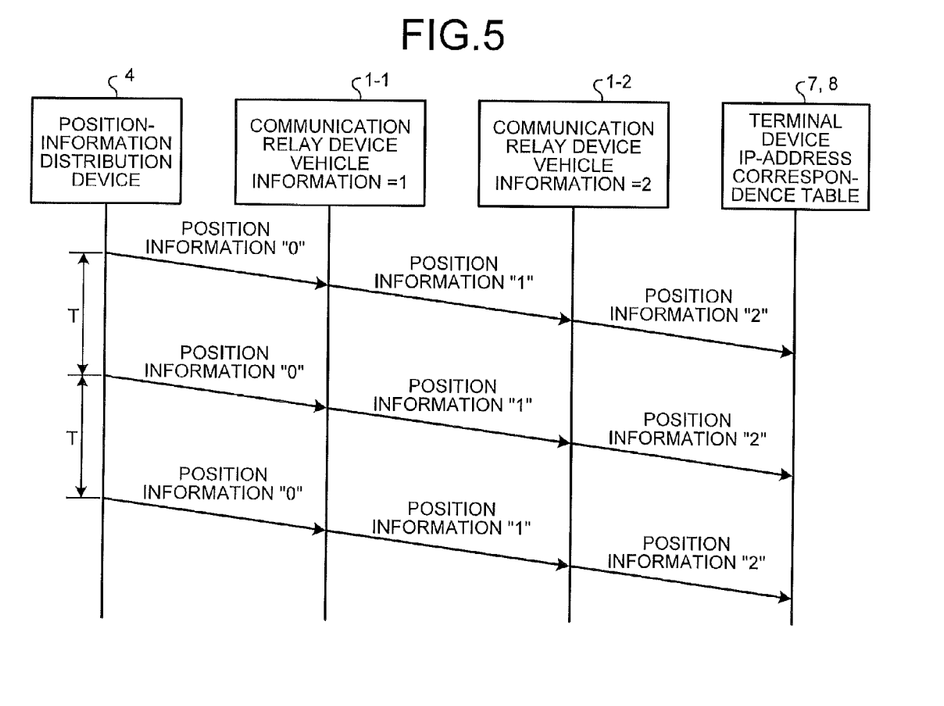
FIG. 5 is a sequence diagram when a communication relay device and terminal devices receive a position information packet.
Figure 6:
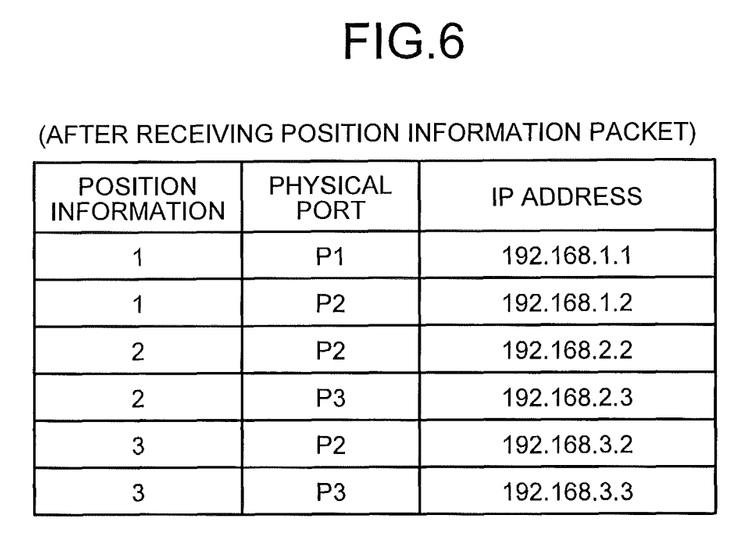
FIG. 6 is a diagram showing an example of the contents of an IP-address correspondence table set in a terminal device.

FIG. 1 is a configuration diagram of a train communication system according to a first embodiment of the present invention; FIG. 2 is a block diagram showing an internal configuration of a communication relay device 1; FIG. 3 is a configuration diagram of a position information packet output from a position-information distribution device 4; FIG. 4 is a sequence diagram of when terminal devices 5 and 6 receive a position information packet 4a; FIG. 5 is a sequence diagram of when a communication relay device 1-2 and terminal devices 7 and 8 receive the position information packet 4a; and FIG. 6 is a diagram showing an example of the contents of an IP-address correspondence table set in a terminal device.

In FIG. 1, for example, a formation consisting of three vehicles is shown, where a first car 11 is the leading vehicle, and a second car 12 and a third car 13 are the trailing vehicles, the vehicles being connected in the order they appear in this sentence to the first car 11. The train communication system set up in this formation includes a plurality of communication relay devices 1-1 to 1-3; a position-information distribution device 4 that outputs the position information packet 4a; and a plurality of terminal devices 5 to 10. The terminal devices 5 to 10 are devices (such as a brake or an air conditioner) of various types having a communication function. Furthermore, the number of vehicles constituting the formation and the number of terminal devices provided in each vehicle can be set arbitrarily.

The communication relay device 1-1, the terminal device 5, the terminal device 6, and the position-information distribution device 4 are provided in the first car 11; the communication relay device 1-2, the terminal device 7, and the terminal device 8 are provided in the second car 12; and the communication relay device 1-3, the terminal device 9, and the terminal device 10 are provided in the third car 13. The terminal device 5 is connected to the communication relay device 1-1 via a physical port P1, the terminal device 6 is connected to the communication relay device 1-1 via a physical port P2, and the position-information distribution device 4 is connected to the communication relay device 1-1 via a physical port P3. The terminal device 7 is connected to the communication relay device 1-2 via the physical port P2, and the terminal device 8 is connected to the communication relay device 1-2 via the physical port P3. The terminal device 9 is connected to the communication relay device 1-3 via the physical port P2, and the terminal device 10 is connected to the communication relay device 1-3 via the physical port P3. Furthermore, the communication relay device 1-1 and the communication relay device 1-2 are connected to each other via the physical port P4 and the physical port P1; and the communication relay device 1-2 and the communication relay device 1-3 are connected to each other via a physical port P4 and the physical port P1.

In FIG. 2, the communication relay device 1 collectively represents the communication relay devices 1-1, 1-2, and 1-3, and the communication relay device 1 is configured such that it includes a vehicle-information recording unit 1a and a position-information rewriting unit 1b.

The vehicle-information recording unit 1a records therein vehicle information (such as car numbers) indicating the position of the vehicle provided with the communication relay device 1 in the train formation. An applicable method of recording vehicle information in the vehicle-information recording unit 1a is to input information using a communication interface (not shown) provided in the communication relay device 1. For example, vehicle information "1" is recorded in the vehicle-information recording unit 1a of the communication relay device 1-1, vehicle information "2" is recorded in the vehicle-information recording unit 1a of the communication relay device 1-2, and vehicle information "3" is recorded in the vehicle-information recording unit 1a of the communication relay device 1-3.

When the position-information rewriting unit 1b receives the position information packet 4a from the position-information distribution device 4, the position-information rewriting unit 1b extracts position information set in the position information packet 4a, rewrites the value of the extracted position information to the value of vehicle information recorded in the vehicle-information recording unit 1a, and transfers the rewritten value. Furthermore, when the position-information rewriting unit 1b receives an IP address from an IP-address distribution device 35a, which is explained in the fourth embodiment, the position-information rewriting unit 1b rewrites the value of the third octet of the IP address with the vehicle information recorded in the vehicle-information recording unit 1a and then transfers the rewritten information as vehicle position information.

In FIG. 3, the position information packet 4a from the position-information distribution device 4 is constituted by a transmission destination address, a transmission source address, an information type, and position information. A broadcast address is set in the transmission destination address, and an IP address of the position-information distribution device 4 is set in the transmission source address. The information type is a value for identifying that a packet output from the position-information distribution device 4 is the position information packet 4a. The position information, for example, is information (such as vehicle position information) set indicating the position of a vehicle, in the train formation, that is provided with the position-information distribution device 4. Note that in the first embodiment, because the position-information distribution device 4 is provided in the first car 11, "1" is set as the position information; however, it is not always necessary to set a vehicle position number as the position information.

When the car number is not known, information indicating that the car number is not known (for example, "0") can be set.

Operations when the position information packet 4a from the position-information distribution device 4 is received by the terminal devices 5 and 6 are explained below with reference to FIG. 4. The position information packet 4a to be transmitted by a broadcast in each predetermined period T from the position-information distribution device 4 is received by the communication relay device 1-1, and the value "0" set in position information is rewritten to vehicle information "1" recorded in the communication relay device 1-1. In the communication relay device 1-1, even when the value of the position information of the position information packet 4a is "1", this value is rewritten to the vehicle information "1". The rewritten position information packet 4a is periodically received by the terminal devices 5 and 6 via all the physical ports other than the physical port P3 that has received the position information packet 4a from the position-information distribution device 4.

Operations when the position information packet 4a from the position-information distribution device 4 is received by the terminal devices 7 and 8 are explained next with reference to FIG. 5. The position information packet 4a to be transmitted by a broadcast in each predetermined period T from the position-information distribution device 4 is received by the communication relay device 1-1, and the value "0" set in position information in the position information packet 4a is rewritten to the vehicle information "1" recorded in the communication relay device 1-1. The rewritten position information packet 4a is periodically received by the communication relay device 1-2 via all the physical ports other than the physical port P3 that has received the position information packet 4a from the position-information distribution device 4. In the position information packet 4a received by the communication relay device 1-2, the value "1" set in its position information is rewritten to the vehicle information "2" recorded in the communication relay device 1-2. The rewritten position information packet 4a is periodically received by the terminal devices 7 and 8 via all the physical ports other than the physical port P1 that has received the position information packet 4a from the communication relay device 1-1.

The IP-address correspondence table shown in FIG. 6 is registered in each of the terminal devices 5 to 10, and a group of IP addresses corresponding to pieces of position information (car numbers) and to a plurality of physical ports is registered in the IP-address correspondence table. The group of IP addresses is information for uniquely identifying each of the terminal devices in a train formation. The third octet of the IP addresses corresponds to the value of position information included in the position information packet 4a from each of the communication relay devices 1-1 to 1-3, and the fourth octet of the IP addresses corresponds to values of the physical ports of the communication relay devices 1-1 to 1-3 to which each of the terminal devices 5 to 10 is connected. For example, when the terminal device 5 receives the position information packet 4a from the communication relay device 1-1, in the terminal device 5, an IP address corresponding to "192.168.1.1" is decided, and communication is performed in a communication network by using the decided IP address.

It is explained in the first embodiment of a configuration of a case where the position-information distribution device 4 is connected to the communication relay device 1-1, as an example; however, the connection destination of the position-information distribution device 4 can be the communication relay device 1-2 or the communication relay device 1-3.

As explained above, the train communication system according to the first embodiment includes a network that is formed on a train formation including one or more vehicles; the communication relay device 1 that is provided in each of the vehicles and is connected to the network; one or more terminal devices 5 to 10 that are provided in the vehicles and are connected to the communication relay device 1 in the same vehicle and to the network; and the position-information distribution device 4 that is connected to the communication relay device 1 and distributes position information indicating positions of the vehicles in one formation. The communication relay device 1 rewrites position information from the position-information distribution device 4 to vehicle information indicating positions of vehicles located in the formation, where the communication relay device 1 is provided in the vehicles, and transfers the rewritten information; the terminal devices 5 to 10 include a correspondence table (an IP-address correspondence table) in which IP addresses that are set so as not to overlap with each other for respective types of the terminal devices and are set to correspond to the vehicle information, connection destination information (such as a physical port) of the terminal devices 5 to 10, and the position information; and IP addresses to be allocated to the terminal devices 5 to 10 are decided by using the IP-address correspondence table and the vehicle information from the communication relay device 1. Therefore, between vehicles in a train formation, IP addresses different from each other can be allocated to terminal devices of the same type, and, among train formations, the same IP address can be allocated to terminal devices of the same type located at the same formation position as identified by the same vehicle information. Because such allocation of IP addresses has conventionally been conducted by a manual operation, a considerable amount of cost and laborious operations are required. However, in the train communication system according to the first embodiment, each of the terminal devices 5 to 10 can acquire an IP address individually so that such laborious operations by operators become unnecessary.

Second Embodiment

Figure 7:
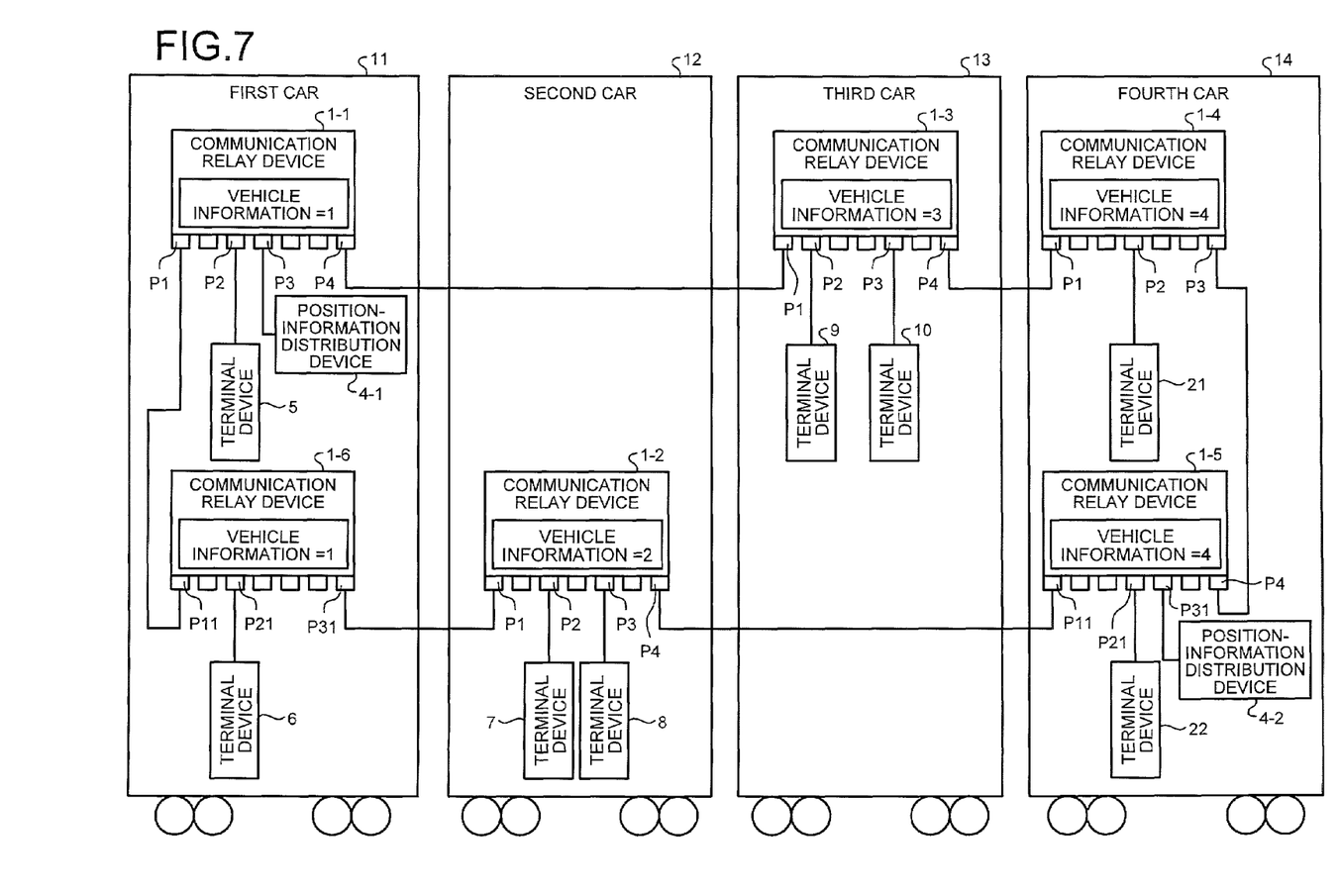
FIG. 7 is a configuration diagram of a train communication system according to a second embodiment of the present invention.

FIG. 7 is a configuration diagram of a train communication system according to a second embodiment of the present invention. In the following descriptions, elements identical to those of the first embodiment are denoted by the same reference numerals and explanations thereof will be omitted, and only elements different from those of the first embodiment are described below.

In FIG. 7, a train formation made up of four vehicles is shown, and a communication system established for the train formation includes a plurality of communication relay devices 1-1 to 1-6, a plurality of position-information distribution devices 4-1 and 4-2, and a plurality of terminal devices 5 to 10, 21, and 22. The second embodiment differs from the first embodiment in that a plurality of the communication relay devices 1-1 to 1-6 makes up a ring network, and a plurality of the position-information distribution devices 4-1 and 4-2 is provided.

A first car 11 is provided with the communication relay device 1-1, the communication relay device 1-6, the terminal device 5, the terminal device 6, and the position-information distribution device 4-1; a second car 12 is provided with the communication relay device 1-2, the terminal device 7, and the terminal device 8; a third car 13 is provided with the communication relay device 1-3, the terminal device 9, and the terminal device 10; and a fourth car 14 is provided with the communication relay device 1-4, the communication relay device 1-5, the terminal device 21, the terminal device 22, and the position-information distribution device 4-2.

The position-information distribution device 4-1 is connected to the communication relay device 1-1 via the physical port P3; the terminal device 21 is connected to the communication relay device 1-4 via the physical port P2; the terminal device 22 is connected to the communication relay device 1-6 via the physical port P21; and the position-information distribution device 4-2 is connected to the communication relay device 1-5 via the physical port P31. Furthermore, the communication relay device 1-1 and the communication relay device 1-3 are connected to each other via the physical ports P4 and P1; the communication relay device 1-3 and the communication relay device 1-4 are connected to each other via the physical ports P4 and P1; the communication relay device 1-4 and the communication relay device 1-5 are connected to each other via the physical ports P3 and P4; the communication relay device 1-5 and the communication relay device 1-2 are connected to each other via the physical ports P11 and P4; the communication relay device 1-2 and the communication relay device 1-6 are connected to each other via the physical ports P1 and P31; and the communication relay device 1-6 and the communication relay device 1-1 are connected to each other via the physical port P11,P1.

Each of the communication relay devices 1-1 to 1-6 is constituted to include the vehicle-information recording unit 1*a* and the position-information rewriting unit 1*b* described above. The vehicle information recorded in the vehicle-information recording unit 1*a* according to the second embodiment is, for example, vehicle information "4", which is recorded in the vehicle-information recording unit 1*a* of the communication relay device 1-4; vehicle information "5", which is recorded in the vehicle-information recording unit 1*a* of the communication relay device 1-5; and vehicle information "6", which is recorded in the vehicle-information recording unit 1*a* of the communication relay device 1-6.

The operations are explained below. An example of an operation is explained in which the position information packet 4*a* from the position-information distribution device 4-1 is received by the terminal device 6 via the communication relay devices 1-1, 1-3, 1-4, 1-5, 1-2, and 1-6. The position information packet 4*a* that is broadcast in each predetermined period T from the position-information distribution device 4-1 is received by the communication relay device 1-1; and a value "0" set in position information of the position information packet 4*a* is rewritten to vehicle information "1", which is recorded in the communication relay device 1-1. The rewritten position information packet 4*a* is periodically received by the communication relay device 1-3 via all the physical ports other than the physical port P3 that has received the position information packet 4*a* from the position-information distribution device 4.

In the position information packet 4*a* received by the communication relay device 1-3, the value "1" set in its position information is rewritten to vehicle information "3" recorded in the communication relay device 1-3. The rewritten position information packet 4*a* is periodically received by the communication relay device 1-4 via all the physical ports other than the physical port P1 that has received the position information packet 4*a* from the communication relay device 1-1.

In the position information packet 4*a* received by the communication relay device 1-4, the value "3" set in its position information is rewritten to vehicle information "4" recorded in the communication relay device 1-4. The rewritten position information packet 4*a* is periodically received by the communication relay device 1-5 via all the physical ports other than the physical port P1 that has received the position information packet 4*a* from the communication relay device 1-3. The position information packet 4*a* received by the communication relay device 1-5 is rewritten to the vehicle information "4" by a rewriting operation similar to that of the communication relay device 1-4; and the rewritten position information packet 4*a* is periodically received by the communication relay device 1-4 via all the physical ports other than the physical port P4 that has received the position information packet 4*a* from the communication relay device 1-4.

In the position information packet 4*a* received by the communication relay device 1-2, a value "4" set in its position information is rewritten to vehicle information "2" recorded in the communication relay device 1-2. The rewritten position information packet 4*a* is periodically received by the communication relay device 1-6 via all the physical ports other than the physical port P4 that has received the position information packet 4*a* from the communication relay device 1-5.

In the position information packet 4*a* received by the communication relay device 1-6, a value "2" set as its position information is rewritten to vehicle information "1" recorded in the communication relay device 1-2. The rewritten position information packet 4*a* is periodically received by the terminal device 6 via all the physical ports other than the physical port P31 that has received the position information packet 4*a* from the communication relay device 1-6.

In the terminal device 6 that has received the position information packet 4*a*, because an IP-address correspondence table similar to that shown in FIG. 2 is set, when the terminal device 6 receives the position information packet 4*a* from the communication relay device 1-6, an IP address (for example, "192.168.1.21") corresponding to position information (vehicle information) is decided so that communication can be performed in a communication network by using the decided IP address. Operations when the position information packet 4*a* from the position-information distribution device 4-2 is received by, for example, the terminal device 21 are identical to the operations described above, and thus explanations thereof will be omitted.

As explained above, in the train communication system according to the second embodiment, a plurality of the communication relay devices 1-1 to 1-6 constitutes a ring network, and two of the communication relay devices (such as the communication relay devices 1-1 to 1-5) constituting the ring network are connected to the position-information distribution device 4-1 and 4-2, respectively. Therefore, in this embodiment, in addition to the effects derived from the first embodiment, because a path along which the position information packet 4*a* is transferred is made up redundantly, even in a case where for example the position-information distribution device 4-1 has a failure, each of the terminal devices 5 to 10, 21, and 22 can perform communication in the ring network by deciding an IP address on the basis of the position information packet 4*a* from the position-information distribution device 4-2.

Third Embodiment

Figure 8:
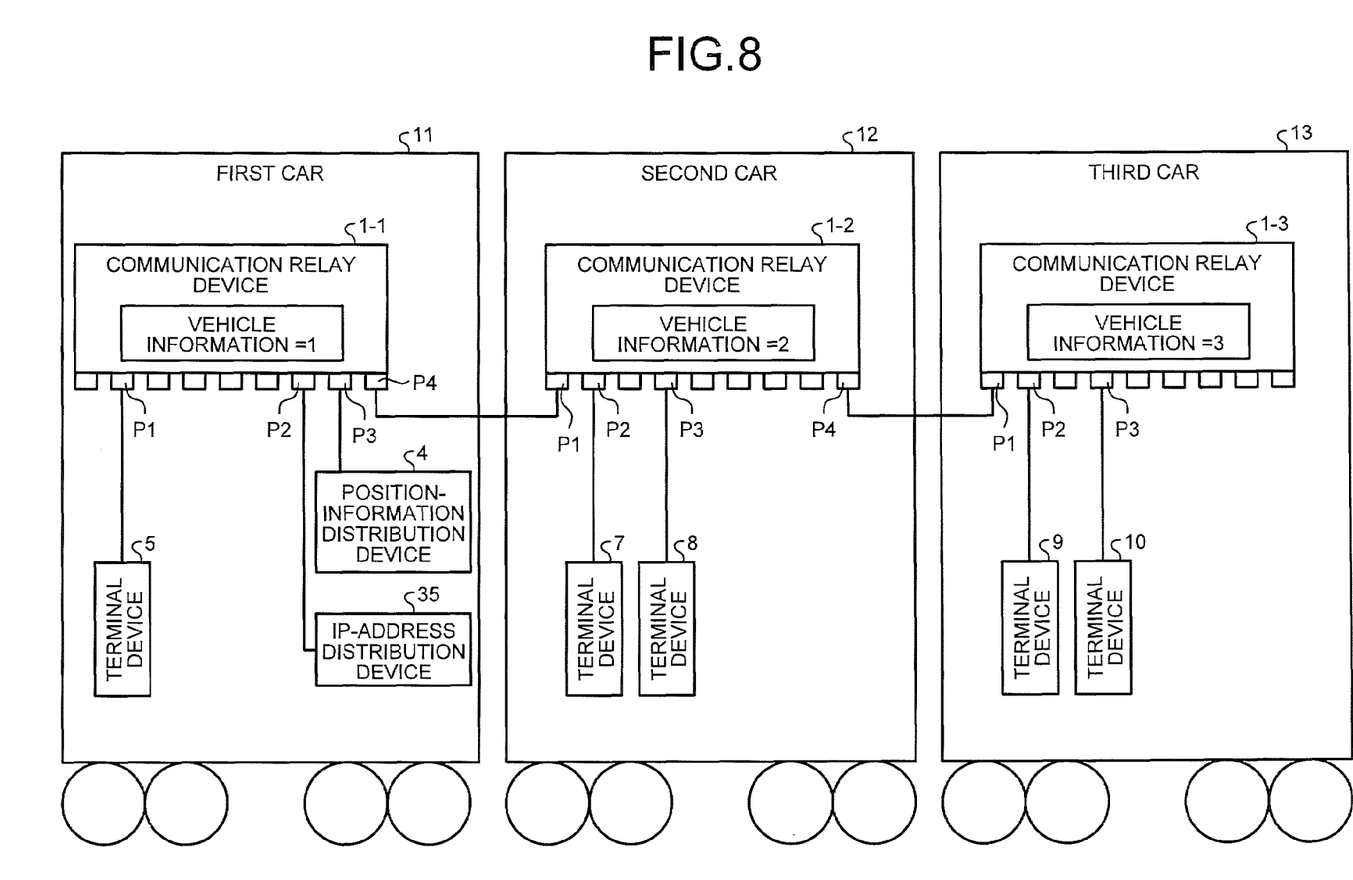
FIG. 8 is a configuration diagram of a train communication system according to a third embodiment of the present invention.
Figure 9:
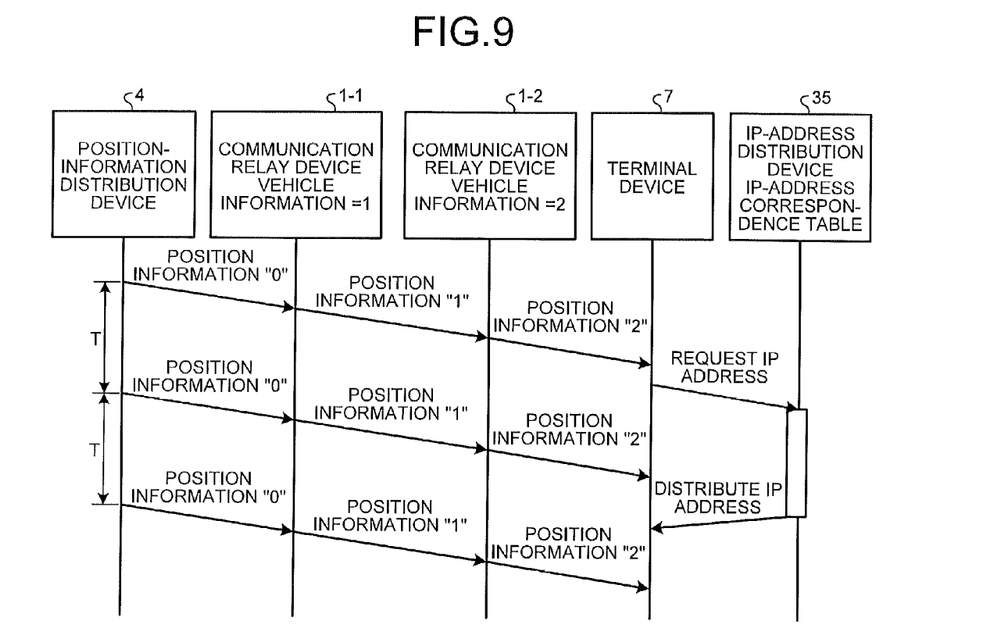
FIG. 9 is a sequence diagram where an IP-address distribution device distributes an IP address.
Figure 10:
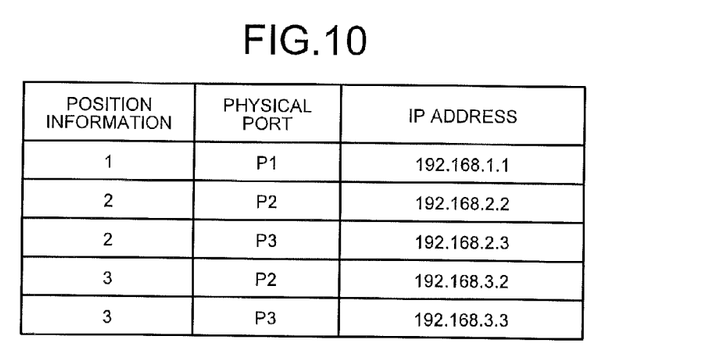
FIG. 10 is a diagram showing an example of the contents of an IP-address correspondence table set in the IP-address distribution device.

FIG. 8 is a configuration diagram of a train communication system according to a third embodiment of the present invention; FIG. 9 is a sequence diagram where an IP-address distribution device 35 distributes an IP address; and FIG. 10 is a diagram showing an example of the contents of an IP-address correspondence table set in the IP-address distribution device 35. In the following explanations, elements identical to those of the first embodiment are denoted by the same reference numerals and explanations thereof will be omitted, and only elements different from those of the first embodiment are described below.

In FIG. 8, the train communication system according to the third embodiment includes a plurality of communication relay devices 1-1 to 1-3, the position-information distribution device 4, the IP-address distribution device 35, and a plurality of the terminal devices 5, 7-10. The difference between the third embodiment and the first embodiment lie in that the IP-address distribution device 35 is connected to the communication relay device 1-1; and that a set of a car number and terminal-device identification information (such as a physical port number of a communication relay device to which a terminal device is connected) is configured to output as an IP-address request signal, instead of each of the terminal devices 5 to 10 having an IP-address correspondence table.

A first car 11 is provided with the communication relay device 1-1, the terminal device 5, and the position-information distribution device 4; and the IP-address distribution device 35 is connected to the communication relay device 1-1 via the physical port P2.

The IP-address distribution device 35 sets therein an IP-address correspondence table shown in FIG. 10. A group of IP addresses corresponding to pieces of position information (car numbers) and to a plurality of physical ports is registered in the IP-address correspondence table. The third octet of the IP addresses corresponds to the car number included in the IP-address request signal, and the fourth octet of the IP addresses corresponds to the physical port number included in the IP-address request signal.

Operations will be explained below with reference to FIG. 9 when the IP-address distribution device 35 has received an IP-address request signal from the terminal device 7 and distributes the IP-address to the terminal device 7. The position information packet 4*a* transmitted by a broadcast in each predetermined period T from the position-information distribution device 4 is received by the communication relay device 1-1. Subsequently, a value "0" set in the position information in the position information packet 4*a* is rewritten to vehicle information "1" recorded in the communication relay device 1-1. The rewritten position information packet 4*a* is periodically received by the communication relay device 1-2 via all the physical ports other than the physical port P3 that has received the position information packet 4*a* from the position-information distribution device 4. In the position information packet 4*a* received by the communication relay device 1-2, the value "1" set in its position information is rewritten to vehicle information "2" recorded in the communication relay device 1-2. The rewritten position information packet 4*a* is periodically received by the terminal device 7 via all the physical ports other than the physical port P1 that has received the position information packet 4*a* from the communication relay device 1-1.

The terminal device 7 having received the position information packet 4*a* from the communication relay device 1-2 sets position information (a car number) "2" and a physical port number "P2" in the IP-address request signal. This IP-address request signal is then transmitted to the IP-address distribution device 35.

In the IP-address distribution device 35 that has received the IP-address request signal, an IP address of "192.168.2.2" is decided, which corresponds to the position information (the car number) "2" and the physical port number "P2" included in the IP-address request signal; and the decided IP address is distributed as the IP-address distribution signal to the terminal device 7 via the communication relay devices 1-1 and 1-2. The terminal device 7 that has received this IP-address distribution signal performs communication over the communication network by using this IP address.

As explained above, the train communication system according to the third embodiment includes a network that is constituted for a train formation including one or more vehicles; the communication relay device 1 that is provided in each of the vehicles and is connected to the network; one or more terminal devices 5 to 10 that are provided in the vehicles and are connected to the communication relay device 1 in the same vehicle and to the network; the position-information distribution device 4 that is connected to the communication relay device 1 and distributes position information indicating positions of the vehicles in a formation; and the IP-address distribution device 35 that is connected to the communication relay device 1 and distributes IP addresses. The communication relay device 1 rewrites position information from the position-information distribution device 4 to vehicle information indicating positions of vehicles that have the communication relay device 1 installed therein in a train formation and then transfers the rewritten information; when the terminal devices 5 to 10 receive position information from the communication relay device 1, the terminal devices 5 to 10 set the position information and connection destination information (a physical port) of the terminal devices 5 to 10 in an IP-address request signal; the IP-address distribution device 35 includes a correspondence table (an IP-address correspondence table) in which IP addresses that are set so as not to overlap with each other for respective types of the terminal devices 5 to 10 and are set so that the vehicle information, the position information, and the path information (a physical port) correspond to each other; IP addresses to be allocated to the terminal devices 5 to 10 are decided on the basis of IP-address request signals from the terminal devices 5 to 10 and the IP-address correspondence table; and decided IP addresses are distributed to the terminal devices 5 to 10 of request sources. Therefore, in the third embodiment, in addition to the effects of the first embodiment, the laborious task of providing an IP-address correspondence table in each of the terminal devices 5 to 10 can be omitted.

Fourth Embodiment

Figure 11:
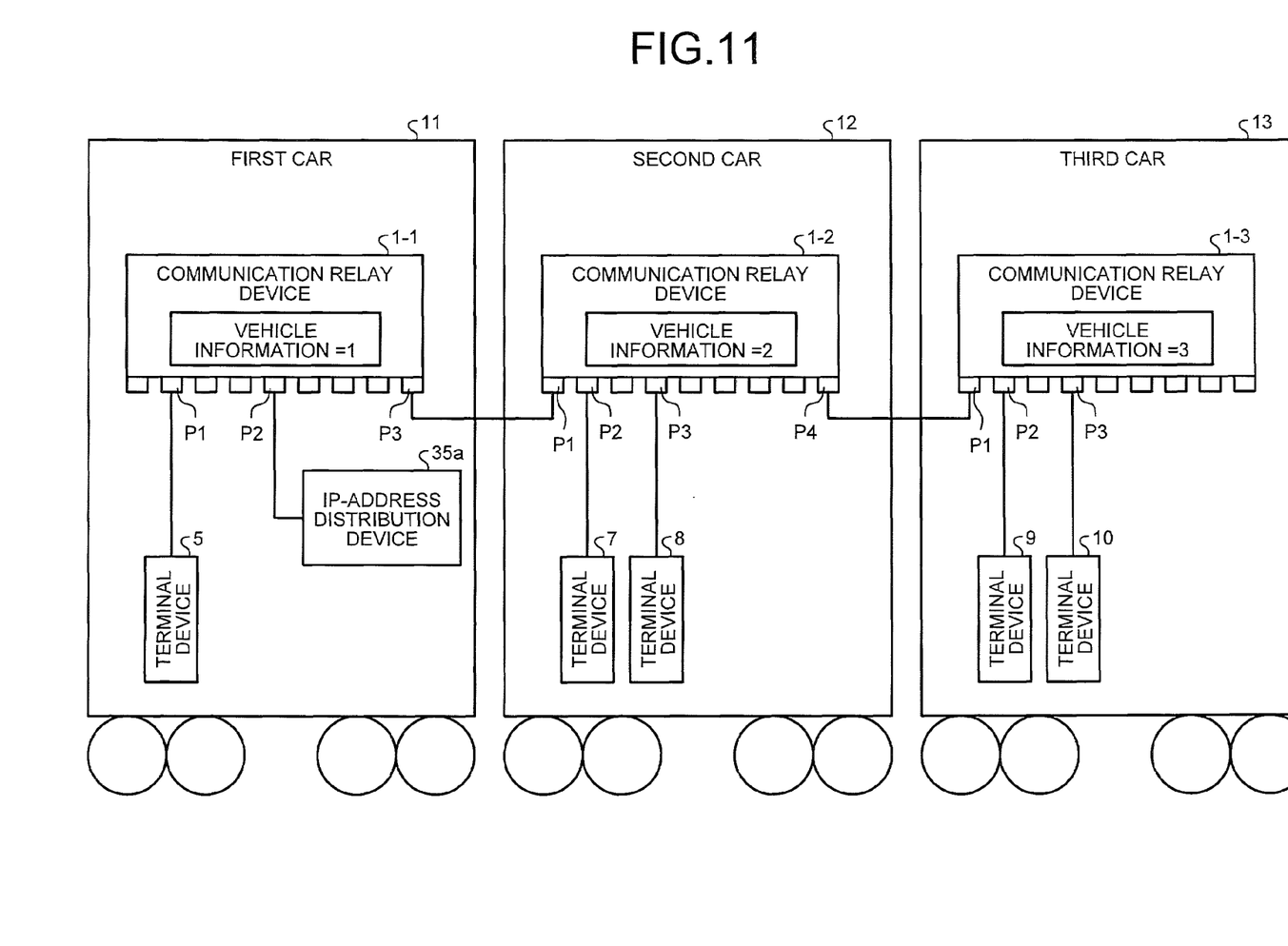
FIG. 11 is a configuration diagram of a train communication system according to a fourth embodiment of the present invention.
Figure 12:
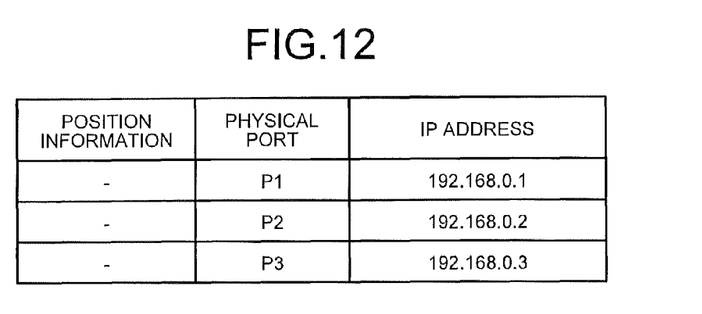
FIG. 12 is a diagram schematically showing an IP address distributed by the IP-address distribution device.
Figure 13:
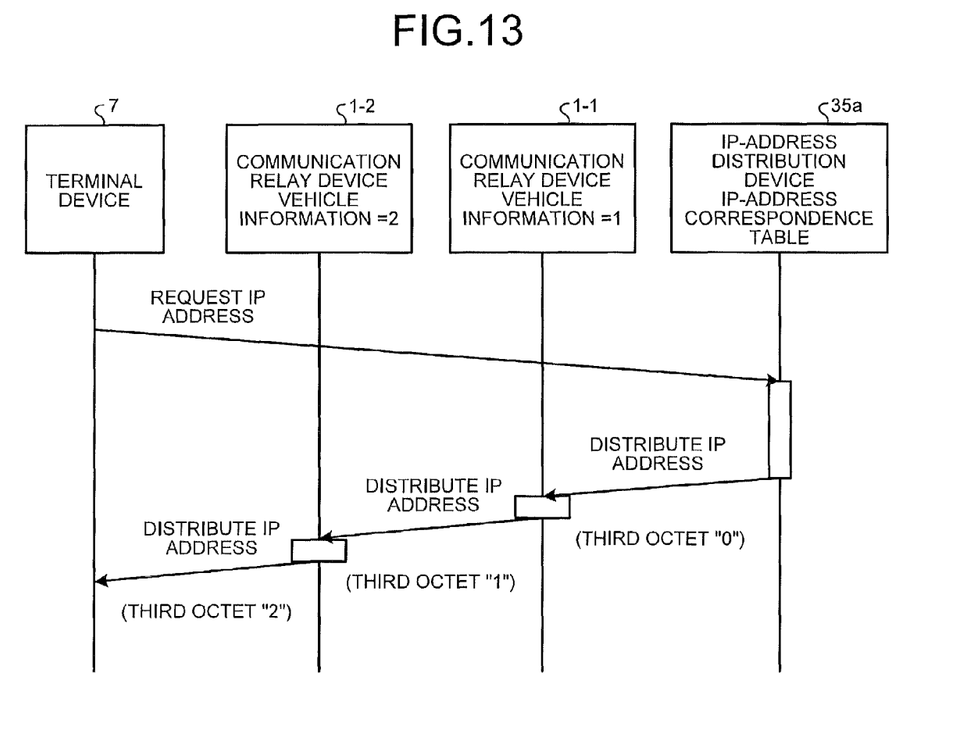
FIG. 13 is a sequence diagram where the IP-address distribution device distributes an IP address.

FIG. 11 is a configuration diagram of a train communication system according to a fourth embodiment of the present invention; FIG. 12 is a diagram schematically showing an IP address distributed by the IP-address distribution device 35*a*; and FIG. 13 is a sequence diagram where the IP-address distribution device 35*a* distributes an IP address. In the following descriptions, elements identical to those of the third embodiment are denoted by the same reference numerals and explanations thereof will be omitted, and only different elements are described below.

In FIG. 11, the train communication system according to the fourth embodiment includes a plurality of communication relay devices 1-1 to 1-3; the IP-address distribution device 35*a*; and a plurality of terminal devices 5, 7-10. The difference between the fourth embodiment and the third embodiment lies in the configuration being such that when the IP-address distribution device 35a receives an IP-address request signal from the terminal devices 5, 7-10, the IP-address distribution device 35a transmits an IP address of which the value of the third octet is not decided to the terminal devices 5, 7-10 of a request source.

A first car 11 is provided with the communication relay device 1-1, the terminal device 5, and the IP-address distribution device 35a; and the IP-address distribution device 35a is connected to the communication relay device 1-1 via the physical port P2.

In the IP-address distribution device 35a, an IP-address correspondence table shown in FIG. 12 is set. A group of IP addresses corresponding to pieces of position information (car numbers) and to a plurality of physical ports is registered in the IP-address correspondence table. In an IP address before the IP-address distribution device 35a receives an IP-address request signal, the third octet is allocated with a provisional value (for example, "0"), and the fourth octet is allocated with the values of the physical ports of the communication relay devices 1-1 to 1-3 that are respectively connected to each of the terminal devices 5 to 10.

Operations are described with reference to FIG. 13 when the IP-address distribution device 35a receives an IP-address request signal from the terminal device 7 and returns an IP address to the terminal device 7. The terminal device 7 sets terminal-device specification information (for example, a physical port number "P2" of the communication relay device 1-2 to which the terminal device 7 is connected) in the IP-address request signal. The IP-address request signal is then transmitted to the IP-address distribution device 35a via the communication relay devices 1-1 and 1-2. The IP-address distribution device 35a that has received the IP-address request signal decides an IP address of "192.168.0.2", which corresponds to the physical port number "P2" included in the IP-address request signal; and the decided IP address is transmitted to the communication relay device 1-1 as an IP-address distribution signal. In the communication relay device 1-1, the value "0" of the third octet of this IP address is rewritten to vehicle information "1", which is recorded in the communication relay device 1-1. The rewritten IP address is transmitted to the communication relay device 1-2 as an IP-address distribution signal. In the communication relay device 1-2, the value "1" of the third octet of this IP address is rewritten to vehicle information "2", which has been recorded in the communication relay device 1-2. As a result, the IP address has a value of "192.168.2.2". Thereafter, this IP address is transmitted to the terminal device 7 as an IP-address distribution signal, and the terminal device 7 performs communication over the communication network by using this IP address.

As explained above, the train communication system according to the fourth embodiment includes a network configured for a train formation including one or more vehicles; the communication relay device 1 that is provided in each of the vehicles and is connected to the network; one or more terminal devices 5 to 10 that are provided in the vehicles and are connected to the communication relay device 1 in the same vehicle and to the network; and the IP-address distribution device 35 that is connected to the communication relay device 1 and distributes IP addresses. The terminal devices 5 to 10 allocate connection destination information (a physical port) of the terminal devices 5 to 10 in an IP-address request signal; the IP-address distribution device 35a includes a correspondence table in which IP addresses that are set so as not to overlap with each other for respective types of the terminal devices 5 to 10 and the path information (a physical port) correspond to each other; IP addresses to be allocated to the terminal devices 5 to 10 are decided on the basis of an IP-address request signal from the terminal devices 5 to 10 and the IP-address correspondence table; decided IP addresses are transmitted to the communication relay device 1; the communication relay device 1 rewrites position information included in an IP address from the IP-address distribution device 35a to vehicle information indicating positions of vehicles in a train formation, the vehicle being provided with the communication relay device 1; and the rewritten IP address is distributed to the terminal devices 5 to 10 of a request source. Therefore, in the fourth embodiment, in addition to the effects of the third embodiment, it is possible to do without the position-information distribution device 4.

The train communication systems according to the embodiments of the present invention are only examples of the content of the present invention. The configuration can be combined with other well-known techniques, and it is needless to mention that the present invention can be configured while modifying it without departing from the scope of the invention, such as omitting a part of the configuration.

INDUSTRIAL APPLICABILITY

As described above, the present invention can be applied to a train communication system, and it is particularly useful as an invention that can reduce the laborious operation of allocating IP addresses of the same type of devices in such a manner that different IP addresses are allocated to the same devices in the same train formation and in such a manner that the same IP addresses are allocated to the same formation position among different train formations.

REFERENCE SIGNS LIST

1, 1-1, 1-2, 1-3, 1-4, 1-5, 1-6 communication relay device
1a vehicle-information recording unit
1b position-information rewriting unit
4, 4-1, 4-2 position-information distribution device
4a position information packet
5, 6, 7, 8, 9, 10, 21, 22 terminal device
11 first car
12 second car
13 third car
14 fourth car
35, 35a IP-address distribution device

The invention claimed is:
1. A train communication system comprising:
a network that is constituted in a train formation including one or more vehicles;
a communication relay device that is provided in each of the vehicles and is connected to the network;
one or more terminal devices that are provided in the vehicles and are connected to the communication relay device in a same vehicle and to the network; and
a position-information distribution device that is connected to the communication relay device and distributes position information indicating positions of the vehicles in the train formation, wherein
the communication relay device includes
a vehicle-information storage unit that stores therein vehicle information indicating positions of the vehicles that are provided with the communication relay device in the train formation, and a position-information rewriting unit that, when having received a position information packet from the position-information distribution device,
extracts position information set in the position information packet,
generates a rewritten position information packet in which a value of extracted position information is rewritten to a value of vehicle information recorded in the vehicle-information storage unit, and
transfers the rewritten position information packet, and
the terminal devices
include a correspondence table in which
IP addresses that are set so as not to overlap with each other for respective types of the terminal devices and are set to correspond to the vehicle information,
a value of a physical port of a communication relay device to which a terminal device is connected, and
the position information correspond to each other, and
decide IP addresses to be allocated to the terminal devices on the basis of the vehicle information from the communication relay devices and the correspondence table.

2. The train communication system according to claim 1, wherein
a plurality of the communication relay devices constitute a ring network, and
two of the communication relay devices constituting the ring network are connected to the position-information distribution device, respectively.

3. The train communication system according to claim 1, wherein
the communication relay device provided in one vehicle transmits the position information packet, which is rewritten to a value of vehicle information recorded in the vehicle-information storage unit, to the communication relay device that is provided in another vehicle different from the one vehicle, and
the communication relay device provided in the another vehicle, having received the position information packet transmitted from the communication relay device provided in the one vehicle,
extracts position information set in a received position information packet,
rewrites a value of the extracted position information to a value of vehicle information recorded in the vehicle-information storage unit, and
transfers a rewritten position information packet.

4. A train communication system comprising:
a network that is constituted in a train formation including one or more vehicles;
a communication relay device that is provided in each of the vehicles and is connected to the network;
one or more terminal devices that are provided in the vehicles and are connected to the communication relay device in a same vehicle and to the network;
a position-information distribution device that is connected to the communication relay device and distributes position information indicating positions of the vehicles in the train formation; and
an IP-address distribution device that is connected to the communication relay device and distributes an IP address, wherein the communication relay device includes
a vehicle-information storage unit that stores therein vehicle information indicating positions of the vehicles that are provided with the communication relay device in the train formation, and
a position-information rewriting unit that, when having received a position information packet from the position-information distribution device,
extracts position information set in the position information packet,
generates a rewritten position information packet in which a value of extracted position information is rewritten to a value of vehicle information recorded in the vehicle-information storage unit, and
transfers the rewritten position information packet, and
the terminal devices, when having received the position information from the communication relay devices, set the position information and connection destination information of the terminal devices into an IP-address request signal, and
the IP-address distribution device, including a correspondence table in which
IP addresses that are set so as not to overlap with each other for respective types of the terminal devices and that are to be used while corresponding to the vehicle information,
the position information, and
a value of a physical port of a communication relay device, to which a terminal device is connected, correspond to each other,
decides IP addresses to be allocated to the terminal devices on the basis of the IP-address request signal from the terminal devices and the correspondence table, and
distributes decided IP addresses to the terminal devices that have requested them.

5. The train communication system according to claim 4, wherein
the communication relay device provided in one vehicle transmits the position information packet, which is rewritten to a value of vehicle information recorded in the vehicle-information storage unit, to the communication relay device that is provided in another vehicle different from the one vehicle, and
the communication relay device provided in the another vehicle, having received the position information packet transmitted from the communication relay device provided in the one vehicle,
extracts position information set in a received position information packet,
rewrites a value of the extracted position information to a value of vehicle information recorded in the vehicle-information storage unit, and
transfers a rewritten position information packet.

6. A train communication system comprising:
a network that is constituted in a train formation including one or more vehicles;
a communication relay device that is provided in each of the vehicles and is connected to the network;
one or more terminal devices that are provided in the vehicles and are connected to the communication relay device in a same vehicle and to the network; and
an IP-address distribution device that is connected to the communication relay device and distributes an IP address, wherein the terminal devices set connection destination information of the terminal devices into an IP-address request signal, the IP-address distribution device, including a correspondence table in which IP addresses that are set so as not to overlap with each other for respective types of the terminal devices and a value of a physical port of a communication-relay device to which the terminal is connected correspond to each other,    decides IP addresses to be allocated to the terminal devices on the basis of an IP-address request signal from the terminal devices and the correspondence table, and    transmits decided IP addresses to the communication relay device, and the communication relay device    rewrites position-information included in the IP-address from the IP-address distribution device to vehicle information indicating positions of the vehicles in which the communication relay device is provided in the train formation, and    distributes the rewritten IP address to the terminal devices that have requested it.

\* \* \* \* \*